(12) United States Patent
Huslak et al.

(10) Patent No.: US 9,860,599 B2
(45) Date of Patent: Jan. 2, 2018

(54) METHODS, SYSTEMS, AND PRODUCTS FOR PROVIDING SAMPLE CONTENT

(75) Inventors: Nicholas Steven Huslak, Duluth, GA (US); Arnold C. McQuaide, Jr., Berkeley Lake, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2253 days.

(21) Appl. No.: 11/156,190

(22) Filed: Jun. 17, 2005

(65) Prior Publication Data

US 2006/0288398 A1 Dec. 21, 2006

(51) Int. Cl.
| | |
|---|---|
| G06F 3/00 | (2006.01) |
| G06F 13/00 | (2006.01) |
| H04N 5/445 | (2011.01) |
| H04N 21/4722 | (2011.01) |
| H04N 21/462 | (2011.01) |
| H04N 21/454 | (2011.01) |
| H04N 21/2343 | (2011.01) |
| H04N 21/258 | (2011.01) |
| H04N 21/442 | (2011.01) |
| H04N 21/482 | (2011.01) |
| H04N 21/8549 | (2011.01) |
| H04N 21/422 | (2011.01) |
| H04N 21/431 | (2011.01) |
| H04N 21/47 | (2011.01) |

(52) U.S. Cl.
CPC ..... *H04N 21/4722* (2013.01); *H04N 5/44543* (2013.01); *H04N 21/23439* (2013.01); *H04N 21/25891* (2013.01); *H04N 21/44222* (2013.01); *H04N 21/454* (2013.01); *H04N 21/462* (2013.01); *H04N 21/482* (2013.01); *H04N 21/8549* (2013.01); *H04N 21/42204* (2013.01); *H04N 21/4316* (2013.01); *H04N 21/47* (2013.01)

(58) Field of Classification Search
CPC ........... H04N 21/44222; H04N 21/454; H04N 21/462; H04N 21/4722; H04N 21/8549
USPC .......................... 725/38, 40, 41, 43, 46, 100
See application file for complete search history.

(56) References Cited

U.S. PATENT DOCUMENTS

| | | | |
|---|---|---|---|
| 4,587,520 A | 5/1986 | Astle | |
| 5,307,086 A | 4/1994 | Griffin | |
| 5,523,796 A * | 6/1996 | Marshall et al. | 725/41 |
| 5,710,605 A | 1/1998 | Nelson | |
| 6,002,450 A | 12/1999 | Darbee et al. | |
| 6,005,597 A * | 12/1999 | Barrett et al. | 725/46 |
| 6,118,493 A | 9/2000 | Duhault | |
| 6,130,726 A | 10/2000 | Darbee | |

(Continued)

*Primary Examiner* — Jeremy Duffield
(74) *Attorney, Agent, or Firm* — Scott P. Zimmerman, PLLC

(57) ABSTRACT

Methods, systems, devices, and products provide sample content. One such device includes a processor that receives an electronic programming guide including a listing of available content. The processor also receives an ancillary stream of including samples of content listed in the electronic programming guide. The processor receives a subscriber input that selects a particular content from the electronic programming guide. The processor filters unselected samples of content from the ancillary stream of data to produce a sample of the selected particular content. The processor processes the sample as a video signal, thus producing a preview of the selected particular content.

20 Claims, 14 Drawing Sheets

(56) References Cited

U.S. PATENT DOCUMENTS

| | | |
|---|---|---|
| 6,263,503 B1 | 7/2001 | Margulis |
| 6,298,482 B1 * | 10/2001 | Seidman et al. ............... 725/101 |
| 6,323,911 B1 | 11/2001 | Schein |
| 6,408,437 B1 * | 6/2002 | Hendricks et al. ............ 725/132 |
| 6,425,129 B1 * | 7/2002 | Sciammarella et al. ......... 725/38 |
| 6,453,471 B1 * | 9/2002 | Klosterman .................... 725/41 |
| 6,515,680 B1 | 2/2003 | Hendricks |
| 6,522,342 B1 | 2/2003 | Gagnon |
| 6,532,592 B1 | 3/2003 | Shintani |
| 6,538,672 B1 * | 3/2003 | Dobbelaar .................... 715/810 |
| 6,563,515 B1 * | 5/2003 | Reynolds et al. ............... 725/41 |
| 6,637,029 B1 | 10/2003 | Maissel et al. |
| 6,718,551 B1 * | 4/2004 | Swix et al. ..................... 725/32 |
| 6,747,591 B1 | 6/2004 | Lilleness |
| 6,763,391 B1 * | 7/2004 | Ludtke ............................ 725/78 |
| 6,832,385 B2 | 12/2004 | Young |
| 6,836,296 B1 | 12/2004 | Terakado |
| 6,862,741 B1 | 3/2005 | Grooters |
| 6,931,198 B1 | 8/2005 | Hamada et al. |
| 6,970,127 B2 | 11/2005 | Rakib |
| 6,977,691 B1 * | 12/2005 | Middleton et al. ........... 348/473 |
| 7,100,183 B2 | 8/2006 | Kunkel et al. |
| 7,188,355 B1 * | 3/2007 | Prokopenko et al. .......... 725/46 |
| 7,373,652 B1 * | 5/2008 | Bayrakeri et al. .............. 725/40 |
| 7,627,824 B2 | 12/2009 | Segel |
| 7,690,013 B1 * | 3/2010 | Eldering et al. ................ 725/36 |
| 2001/0033244 A1 | 10/2001 | Harris |
| 2002/0059623 A1 * | 5/2002 | Rodriguez et al. ............. 725/91 |
| 2002/0059637 A1 | 5/2002 | Rakib |
| 2002/0129375 A1 * | 9/2002 | Kim et al. ..................... 725/100 |
| 2002/0162120 A1 | 10/2002 | Mitchell |
| 2003/0005447 A1 | 1/2003 | Rodriguez |
| 2003/0020744 A1 * | 1/2003 | Ellis et al. ..................... 345/723 |
| 2003/0033157 A1 * | 2/2003 | Dempski et al. ................. 705/1 |
| 2003/0046704 A1 * | 3/2003 | Laksono et al. ................ 725/96 |
| 2003/0079224 A1 | 4/2003 | Komar |
| 2004/0139465 A1 | 7/2004 | Matthews |
| 2004/0148629 A1 | 7/2004 | Shibamiya |
| 2004/0152414 A1 | 8/2004 | Wang |
| 2004/0158854 A1 | 8/2004 | Nagasawa |
| 2004/0221308 A1 * | 11/2004 | Cuttner et al. .................. 725/46 |
| 2004/0230992 A1 | 11/2004 | Yuen |
| 2006/0218584 A1 | 9/2006 | Gildred |
| 2007/0245382 A1 | 10/2007 | Doi et al. |

\* cited by examiner

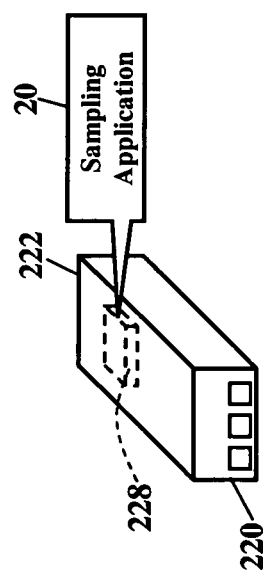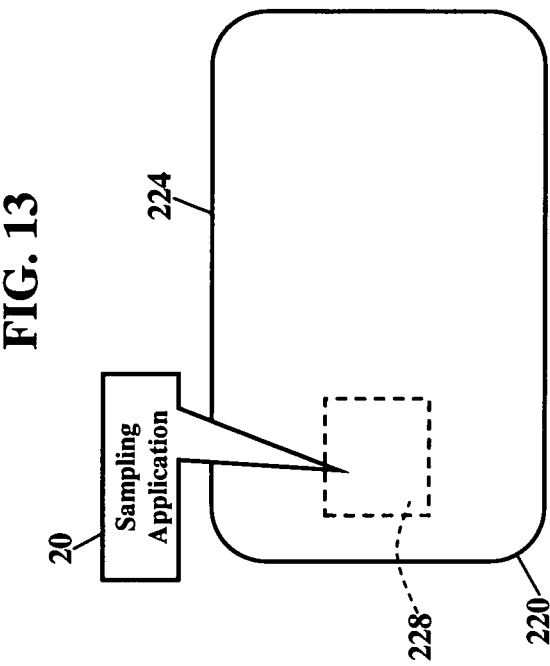
FIG. 12
FIG. 13

METHODS, SYSTEMS, AND PRODUCTS FOR PROVIDING SAMPLE CONTENT

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to data processing and to interactive distribution systems and, more particularly, to content sampling.

Current electronic programming guides are generally linear. That is, the subscribing user continuously scrolls along the electronic programming guide and views the programming available at different time slots (or "cells"). Digital cable or digital satellite subscribers might receive a slightly more sophisticated programming guide, but the subscriber still scrolls along the cells or watches a repeating "carrousel" loop of program offerings. The subscriber, regardless of the type of electronic programming guide, must decipher some abbreviated phrasing that cryptically describes the program (such as the name of the program or a brief description of the subject matter). The subscriber is forced to tune to a particular program to truly determine whether the program meets the subscriber's entertainment desires.

What is needed, however, is methods, systems, devices, and products providing an improved electronic programming guide. This improved electronic programming guide should provide a fuller description of the particular program, thus helping the subscriber gain a better understanding of the subject matter. This improved electronic programming guide, however, could also provide a video sample of some or all of the listed programs.

SUMMARY

The aforementioned problems, and other problems, are reduced, according to the exemplary embodiments, using methods, systems, and products that provide sample content for electronic programming guides. The exemplary embodiments allow a subscriber to select content listed in the electronic programming guide. The exemplary embodiments then provide a sample of the selected content to facilitate content browsing. The selected content can be a currently playing program, a program that is scheduled to play at some point in the future, or a program that is available on demand for viewing at any time. The sample may be an actual video clip from the actual movie, program, or other content. If the program is currently in progress, the sample could be a low resolution or small scale version of the material being transmitted. The sample, for example, may be a movie preview. The sample, however, could be detailed textual descriptions of the content (such as subject matter, actors/actresses, director, producer, and rating). The sample may also include interviews or reviews describing the content.

The exemplary embodiments describe a device that provides sample content. The device has a processor that receives an electronic programming guide that includes a listing of available content. The processor also receives an ancillary stream of data. The ancillary stream of data includes samples (or compressed streams) of content listed in the electronic programming guide. The processor receives a subscriber input that selects a particular content from the electronic programming guide. The processor filters unselected samples of content from the ancillary stream of data to produce a sample of the selected particular content. The processor processes the sample as a video signal, thus producing a preview of the selected particular content.

In another of the embodiments, a method provides sample content. The method receives an electronic programming guide comprising a listing of available content. An ancillary stream of data is also received, and the ancillary stream of data comprises samples of content listed in the electronic programming guide. A subscriber input is received that selects a particular content from the electronic programming guide. Any unselected samples of content are filtered from the ancillary stream of data, thus producing a remaining sample of the selected particular content. The sample is then processed as a video signal, thus producing a preview of the selected particular content.

In yet another embodiment, a computer program product also provides sample content. The computer program product includes a computer-readable medium and a sampling application stored on the computer-readable medium. The sampling application comprises computer code for receiving an electronic programming guide, and the electronic programming guide comprises a listing of available content. An ancillary stream of data is received, and the ancillary stream of data comprises samples of content listed in the electronic programming guide. A subscriber input is also received that selects a particular content from the electronic programming guide. Any unselected samples of content are filtered from the ancillary stream of data to produce a sample of the selected particular content. The remaining sample is processed as a video signal, thus producing a preview of the selected particular content.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 11-14 are schematics further illustrating various media devices for providing sample content, according to the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products provide sample content for electronic programming guides. The exemplary embodiments allow a subscriber to select content listed in the electronic programming guide. The exemplary embodiments then provide a sample of the selected content. The sample may be an actual video clip (or, if programming material is currently in progress, the sample may be a real-time compressed sample of the actual content) from the actual movie, program, or other content. The sample, for example, may be a movie preview. The sample, however, could be detailed textual descriptions of the content (such as subject matter, actors/actresses, director, producer, and rating). The sample may also include interviews or reviews describing the content.

Figure 1:
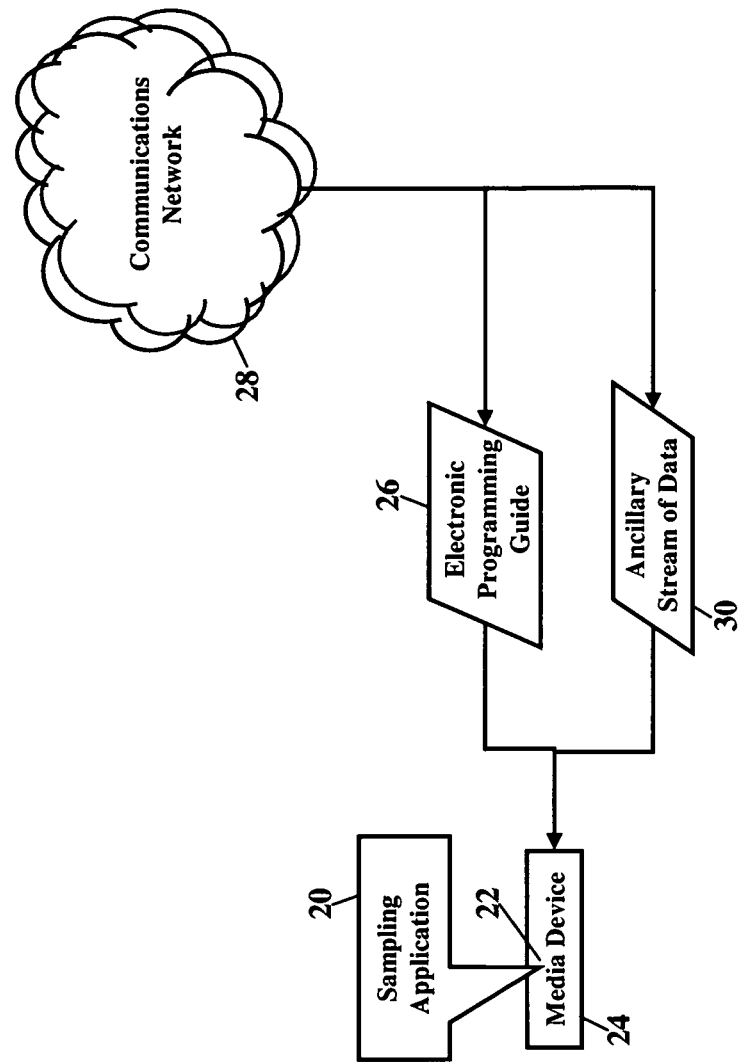
FIGS. 1 and 2 are schematics illustrating a sampling application, according to the exemplary embodiments.
Figure 2:
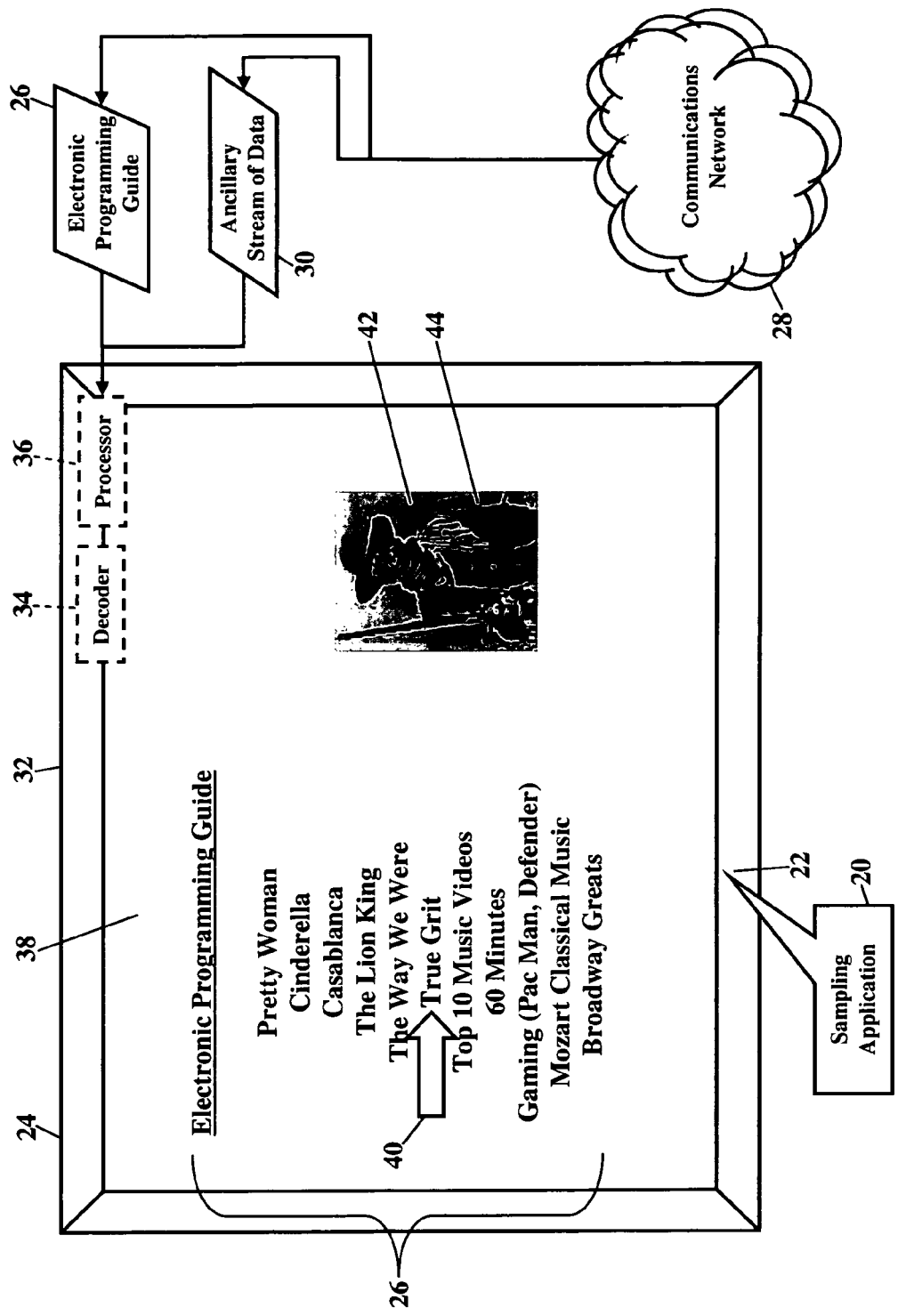

FIGS. 1 and 2 are schematics illustrating the exemplary embodiments. A sampling application 20 is stored in memory 22 of a media device 24. Some or all portions of the sampling application 20 may be stored in memory in a remote computer server as will be detailed later. Although the media device 24 is generically shown, the media device 24, as will be later explained, may be a computer, a television, a television integrated with a decoder (or set-top box), a personal digital assistant (PDA), a cordless/cellular/ IP phone, or any other wireline/wireless communications device. The media device 24 receives an electronic programming guide 26 from a communications network 28. The electronic programming guide 26 comprises an electronic listing of available content, such as movies, programs, music, games, or other content that is currently playing, playing at a scheduled time in the future, or available on demand for viewing at any time. The electronic programming guide 26 may additionally or alternatively comprise a listing of available channels and the programming available on each channel. The media device 24 also receives an ancillary stream 30 of data via the communications network 28. The ancillary stream 30 of data comprises samples of content listed in the electronic programming guide 26. As the following paragraphs further explain, the sampling application 20 provides a sample, or preview, of content listed in the electronic programming guide 26. That is, as a subscriber reviews the electronic programming guide 26, the sampling application 20 processes the ancillary stream 30 of data to provide a preview of content listed in the electronic programming guide 26.

FIG. 2 is a schematic further illustrating the exemplary embodiments. Here the media device 24 is shown as an integrated television 32 and decoder 34. The decoder 34, however, may be a separate component, commonly termed a set-top box. A processor 36 receives the electronic programming guide 26 and the ancillary stream 30 of data. The processor then causes the electronic programming guide 26 to be visually presented via a display device 38. As a subscriber browses the electronic programming guide 26, the subscriber can preview content. The processor 36 receives a subscriber input that selects a particular content from the electronic programming guide 26. The subscriber, for example, places an on-screen cursor 40 over listed content. The sampling application 20 filters and processes the ancillary stream 30 of data to provide a preview of the content listed in the electronic programming guide 26. The sampling application 20 then produces a pop-up sample window 42. The sample window 42 audibly and/or visually presents a sample 44 corresponding to the placement of the cursor 40. FIG. 2, for example, shows the cursor 40 hovering over the particular content "True Grit," and the sample window 42 visually presents the sample 44 of the movie "True Grit." The sample 44 may be actual video and/or descriptive information describing the particular content "True Grit" (such as actors/actresses, director/producer, duration, start/stop times, ratings, textual description, and other information that describes the content). The subscriber can watch/listen to the sample 44 and decide if the particular content satisfies the subscriber's expectations. If the subscriber chooses, instead, to sample other content, the subscriber places the on-screen cursor 40 and selects other listed content to similarly experience other samples.

The sample window 42 may have any resolution. The ancillary stream 30 of data may be communicated from a service provider at any desired resolution. A low resolution sample, for example, may occupy less than ten percent or twenty percent (10% or 20%) of the viewable area of the display device 38. The subscriber, after all, need not receive a full resolution sample in order to decide whether the particular content satisfies the subscriber's expectations. Low resolution samples would also enable the service provider to communicate more samples as a percentage of total bandwidth. If bandwidth is a concern, the low resolution samples would allow more samples of content to be communicated to the subscriber. As the resolution increases, bandwidth constraints may limit the number of samples that can be communicated.

The communications network 28 may have any configuration. The communications network 28, for example, may be a cable network operating in the radio-frequency domain and/or the Internet Protocol (IP) domain. The communications network 32, however, may also include coaxial cables, copper wires, fiber optic lines, and/or hybrid-coaxial lines. The communications network 28 may be a distributed computing network, such as the Internet (sometimes alternatively known as the "World Wide Web"), an intranet, a local-area network (LAN), and/or a wide-area network (WAN). The communications network 32 may even include wireless portions utilizing any portion of the electromagnetic spectrum and any signaling standard (such as the I.E.E.E. 802 family of standards, GSM/CDMA/TDMA or any cellular standard, and/or the ISM band).

Figure 3:
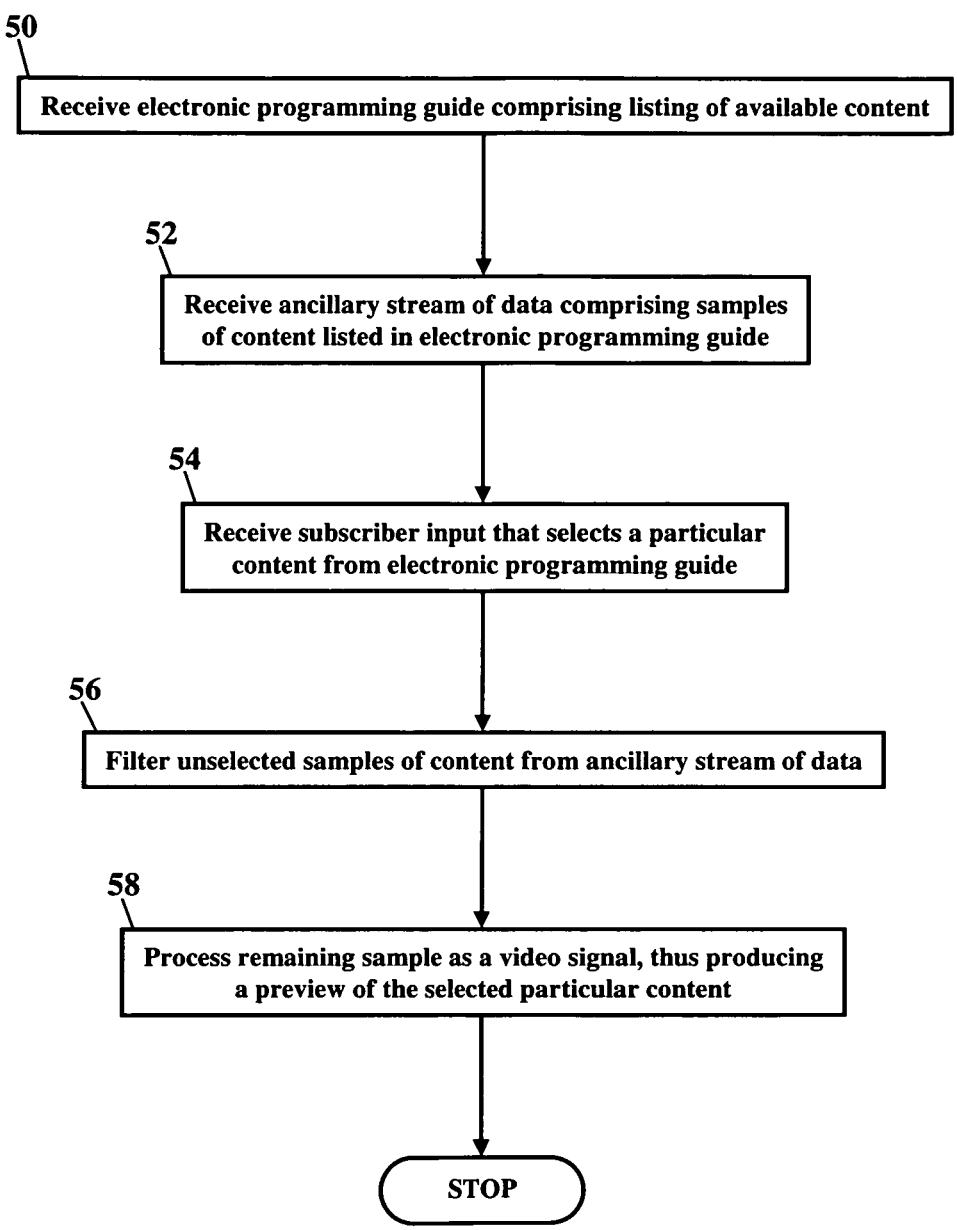
FIGS. 3-5 are flowcharts illustrating a filtering operation for an ancillary stream of data, according to the exemplary embodiments.
Figure 4:
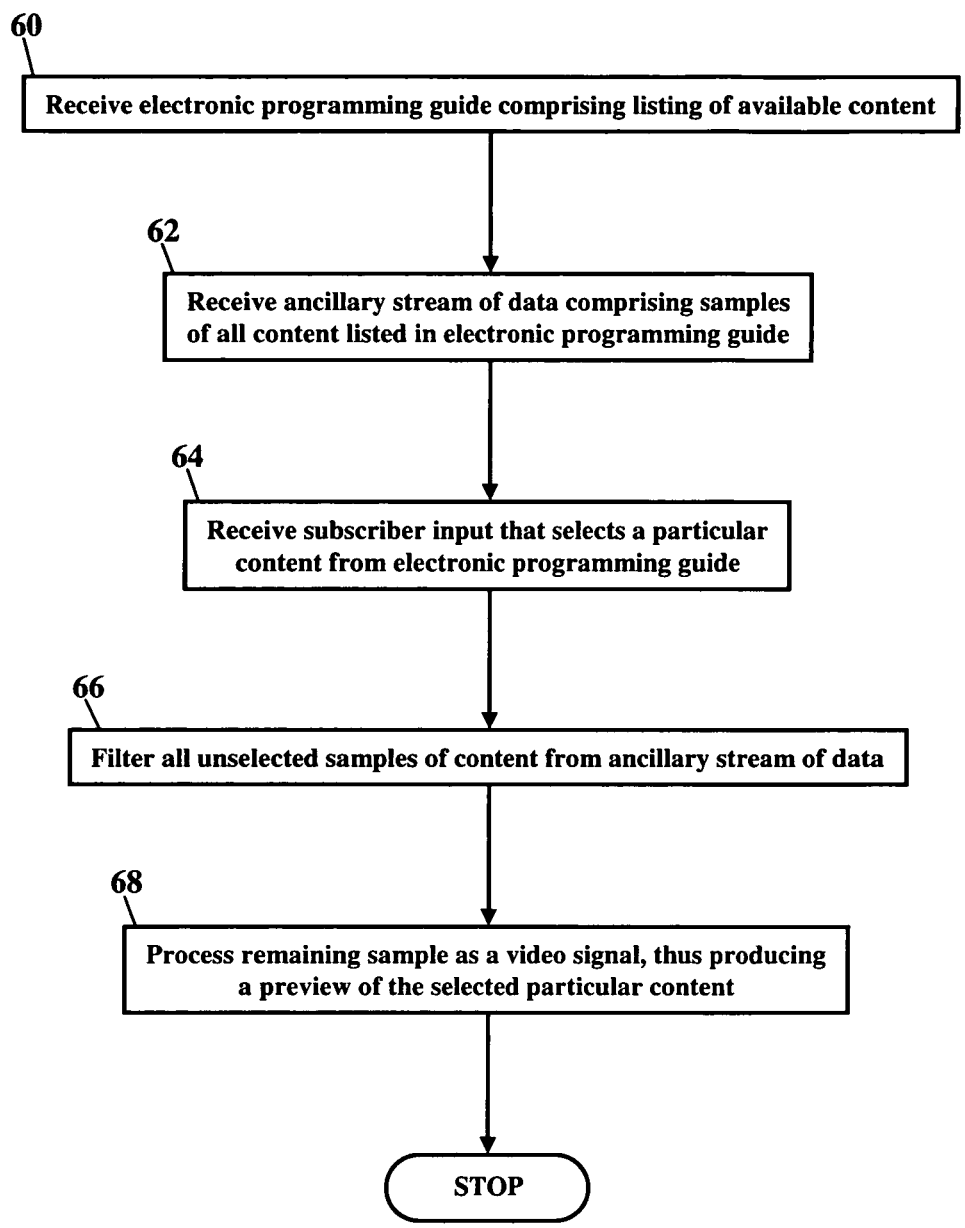
Figure 5:
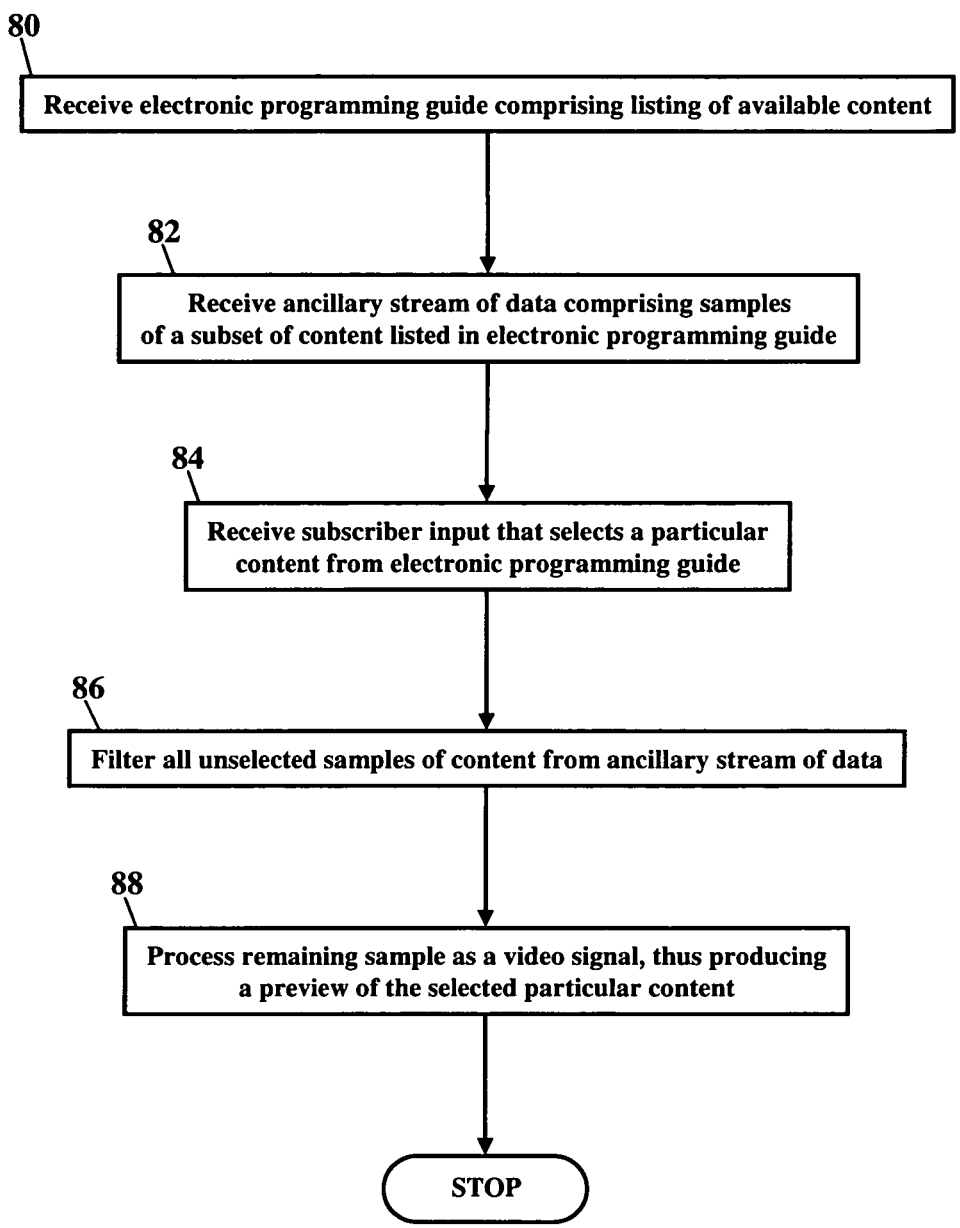

FIGS. 3-5 are flowcharts illustrating a filtering operation for the ancillary stream of data, according to the exemplary embodiments. Here the processor executes computer code or instructions that filter the ancillary stream of data (shown as reference numeral 30 in FIGS. 1 and 2). As FIG. 3 illustrates, the electronic programming guide is received and comprises a listing of available content (Block 50). The ancillary stream of data is also received and comprises samples of content listed in the electronic programming guide (Block 52). Although shown as consecutive steps, it should be appreciated that the steps shown in Blocks 50 and 52 may be performed at the same time and in any order. A subscriber input is received that selects a particular content from the electronic programming guide (Block 54). The unselected samples of content are then filtered from the ancillary stream of data (Block 56). That is, content not selected by the subscriber is removed from the ancillary stream of data. What remains is a sample of the particular content selected by the subscriber. That sample is then processed as a video signal (Block 58), thus producing a preview of the selected particular content.

FIG. 4 is a flowchart further illustrating filtering of the ancillary stream of data, according to the exemplary embodiments. Here the ancillary stream of data comprises samples of all the available content listed in the electronic programming guide. That is, the ancillary stream of data contains a sample of every program, movie, music, and other content listed in the electronic programming guide. The electronic programming guide is received and comprises a listing of available content (Block 60). The ancillary stream of data is also received and comprises samples of all the available content listed in the electronic programming guide (Block 62). It should be appreciated that the steps shown in Blocks 60 and 62 may be performed at the same time or in any order. The subscriber input is received that selects a particular content from the electronic programming guide (Block 64). All the unselected samples of content are then filtered from the ancillary stream of data (Block 66). The remaining sample, corresponding to the selected particular content, is then processed as a video signal (Block 68), thus producing a preview of the selected particular content.

The filtering operation of FIG. 4 produces little or no delay. The ancillary stream of data includes samples of all the available channels or content listed in the electronic programming guide. Whatever channel or content that the subscriber selects is filtered from the ancillary stream of data. Because samples of all available content are delivered via the ancillary stream of data, the subscriber would experience very little delay in seeing the selected video/audio sample. If the sampling application produces each sample as the cursor hovers over the electronic programming guide, then the subscriber quickly sees a change in the sample window (the sampling application, the cursor, the electronic programming guide, and the sample window are shown, respectively, as reference numerals 20, 40, 26, and 42 in FIGS. 1 and 2).

One issue, however, is bandwidth. If the ancillary stream 30 of data contains samples of all the available channels or content, bandwidth may be an issue. The electronic programming guide 26 may list one hundred (100) or more channels or individual selections of content. Even a low resolution sample of each listed content may require an intolerable amount of bandwidth. The service provider and/or the bandwidth limitations within the communications network 28 may require that the ancillary stream 30 of data only include samples of a subset of the available content listed in the electronic programming guide 26.

FIG. 5, then, is a flowchart further illustrating the exemplary embodiments. Here the ancillary stream of data only comprises samples of a subset of the available content listed in the electronic programming guide. That is, the ancillary stream of data does not include samples of all available content listed in the electronic programming guide. The ancillary stream of data, instead, only contains a subset of the available content. As FIG. 5 shows, the electronic programming guide is received and comprises a listing of available content (Block 80). The ancillary stream of data is also received and comprises samples of a subset of the available content listed in the electronic programming guide (Block 82). It should be appreciated that the steps shown in Blocks 80 and 82 may be performed at the same time or in any order. The subscriber input is received that selects a particular content from the electronic programming guide (Block 84). All the unselected samples of content are then filtered from the ancillary stream of data (Block 86). The remaining sample, corresponding to the selected particular content, is then processed as a video signal (Block 88), thus producing a preview of the selected particular content. Here, then, the ancillary stream of data, comprising only samples of a subset of the available content, requires les bandwidth. The service provider, then, need not constantly stream a sample of all content that the subscriber could possibly select.

The subset of available content may be tailored to the subscriber. Because the ancillary stream of data only comprises samples of a subset of available content, that subset may be chosen to best suit the subscriber. If the subset contains samples of content that do not appeal to the subscriber, the subscriber may become dissatisfied with their service. Worse, if the subset fails to appeal to the subscriber, then the service provider is missing an opportunity to target advertisements and other content to willing purchasers. The subset of available content, then, may be tailored to appeal to the subscriber's viewing desires and purchasing habits. This tailoring can be performed by the service provider, the subscriber, by a third party, or by a combination of entities.

Figure 6:
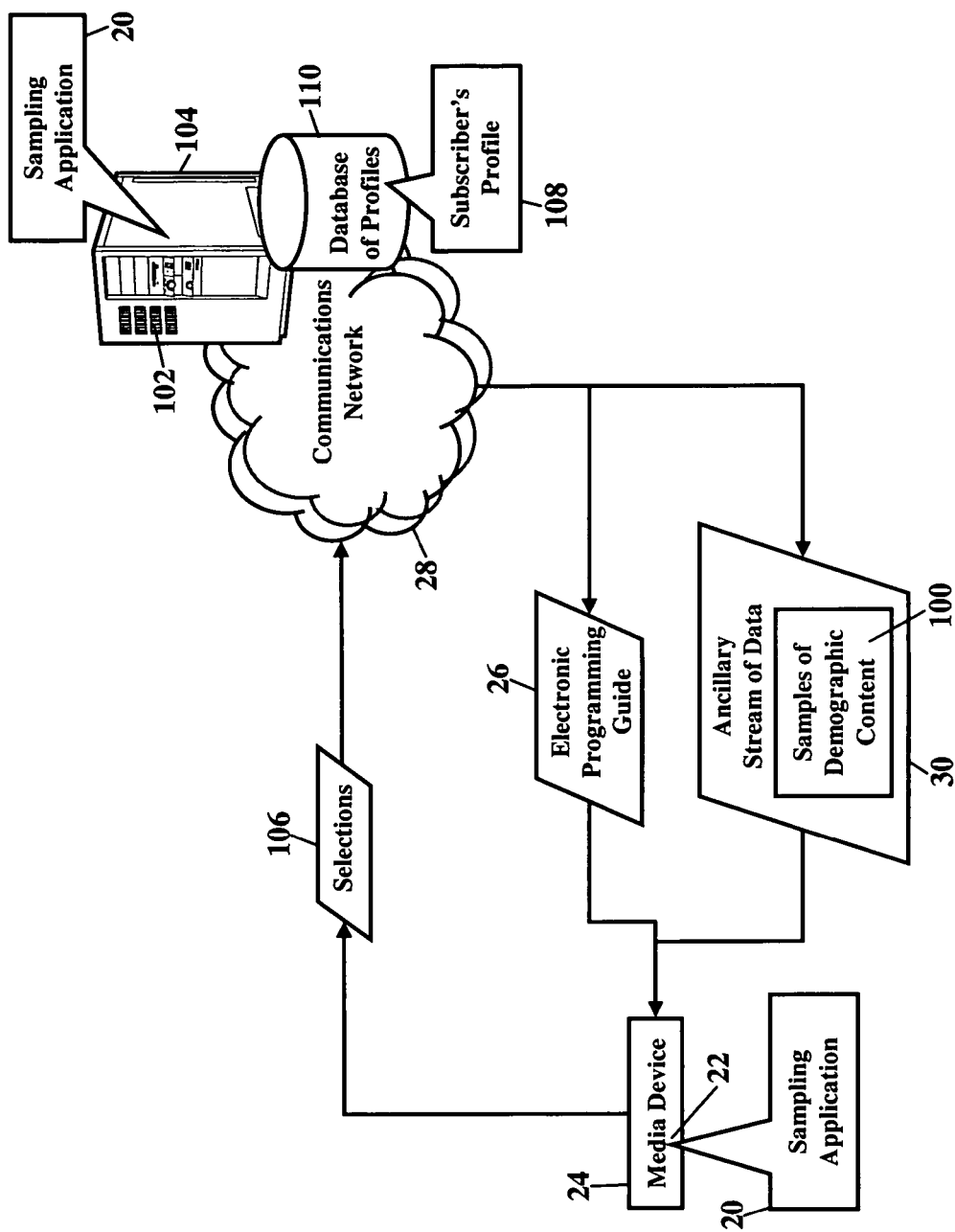
FIG. 6 is a schematic illustrating samples of demographic content, according to the exemplary embodiments.

FIG. 6 is a schematic illustrating samples of demographic content, according to the exemplary embodiments. Here the ancillary stream 30 of data comprises samples 100 of demographic content. The samples 100 of demographic content are tailored to match a profile of the subscriber. As FIG. 6 shows, some or all portions of the sampling application 20 may reside in memory 102 of a computer server 104. As the subscriber makes selections from the electronic programming guide 26, those selections 106 are return communicated via the communications network 28 to the computer server 104. Each selection 106 represents content chosen by the subscriber. The sampling application 20 tracks each selection 106 and builds a profile 108 describing the subscriber's content selections. The subscriber's profile 108 is stored in a database 110 of subscriber profiles. The database 110 of subscriber profiles may be locally maintained by the computer server 104, or the database 110 of subscriber profiles may be remotely located on the communications network 28. The sampling application 20 monitors which sample selections result in a content selection and the duration the actual content is received. That is, the sampling application 20 knows what samples are selected and what content is eventually chosen, based on the sample.

John Wayne's movie "True Grit" provides another example. The sampling application 20 monitors when the subscriber selects to receive a sample of the particular content "True Grit." The sampling application 20 then monitors how much of the sample was received, and the sampling application 20 monitors whether the movie "True Grit" was requested. If the sample 42 is mostly or entirely received, and the movie "True Grit" is then mostly or entirely received, the sampling application 20 may infer that the subscriber enjoys classic westerns, John Wayne films, action-themed content, or some other related descriptor. If, however, the movie "True Grit" is not selected, even after watching the sample 42, the sampling application 20 may infer that such genre is not desirable. The sampling application 20 then stores this information in the subscriber's profile 108. The sampling application 20 may also monitor what content is not selected for a sample preview and, thus, infer that such content is not desirable.

The sampling application 20 then selects demographic samples of content. The sampling application 20 selects samples of demographic content that should appear in the ancillary stream 30 of data. As the subscriber's profile 108 grows with information, a pattern develops. The subscriber's profile 108 will indicate what content appeals to the subscriber. As the sampling application 20 builds the subscriber's profile 108, the sampling application 20 can match the subscriber's profile 108 to a demographic. The service provider may then configure the ancillary stream 30 of data to include samples of content that match that demographic. FIG. 6 shows the service provider communicating the ancillary stream 30 of data to the subscriber's media device 24, and the ancillary stream 30 of data comprises the samples 100 of demographic content that match the subscriber's profile 108.

The samples 100 of demographic content may include any content. Even though the samples 100 of demographic content originate from the listings in the electronic programming guide 26, the samples 100 of demographic content may include advertisements, music, and other content that appeal to the same demographic. So, even though the ancillary stream 30 contains demographic samples, the demographic samples may be accompanied by ads, music, previews, or trailers that demographically appeal to the subscriber's profile. Again, if the subscriber's profile 108 indicates that the subscriber might enjoy a sample of John Wayne's movie "True Grit," the ancillary stream 30 of data might also include other demographically-similar content, such as advertisements for all-terrain vehicles, outdoor products, hunting/fishing/camping equipment and destinations, and even trucks. The samples 100 of demographic content may also include previews or trailers for other John Wayne films, other classic westerns, or other content that appeals to the same demographic.

Figure 7:
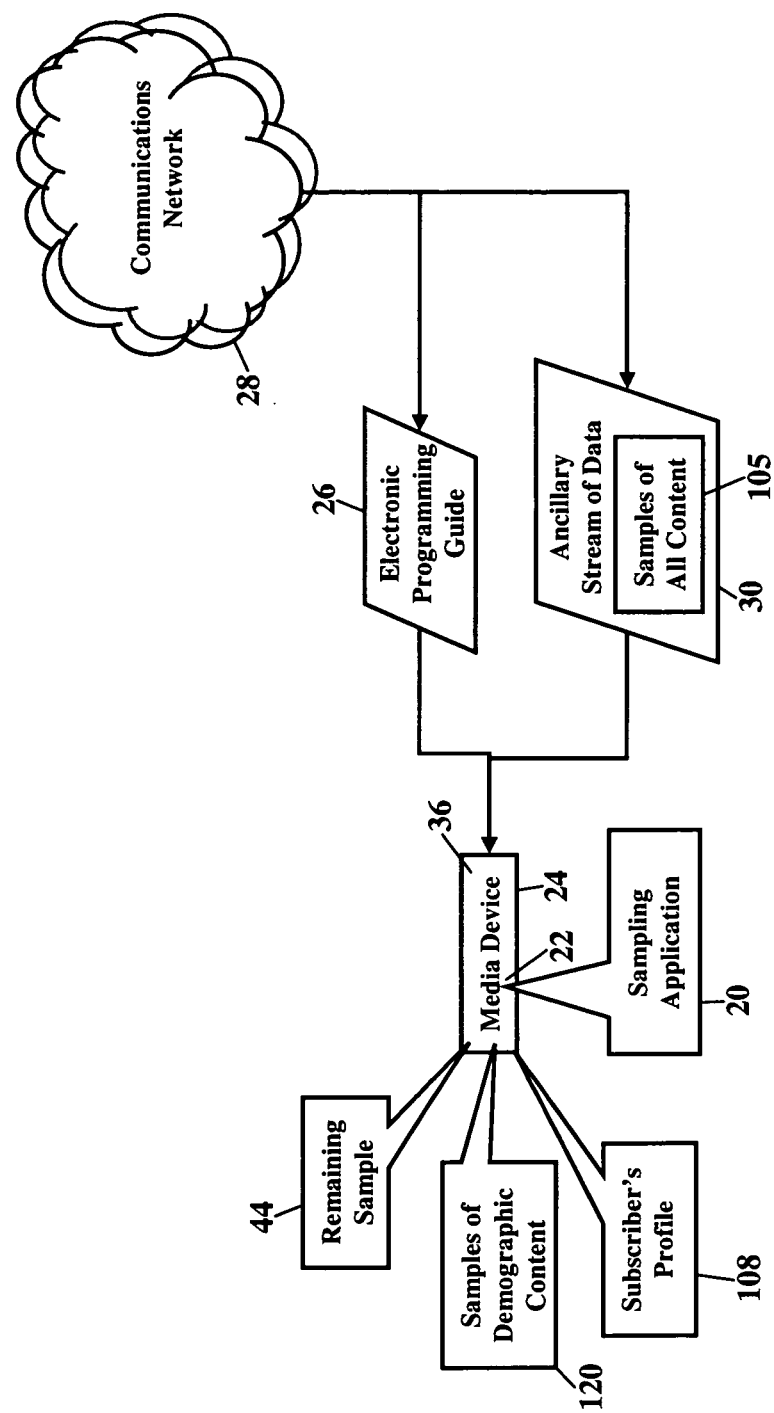
FIG. 7 is a schematic further illustrating filtering of the ancillary stream of data, according to the exemplary embodiments.

FIG. 7 is a schematic further illustrating filtering of the ancillary stream of data, according to the exemplary embodiments. The subscriber's media device 24 receives both the electronic programming guide 26 and the ancillary stream 30 of data. Here, however, the ancillary stream 30 of data comprises samples of all, or most of, the available content listed in the electronic programming guide 26, shown in FIG. 7 as 105. The sampling application 20 operating in the media device 24 locally tracks the subscriber's selections from the electronic programming guide 26. The sampling application 20 then locally builds the profile 108 describing the subscriber's content selections. The subscriber's profile 108 develops a pattern that indicates what content appeals to the subscriber. As the sampling application 20 builds the subscriber's profile 108, the sampling application 20 can match the subscriber's profile 108 to a demographic.

The sampling application 20 then filters the ancillary stream 30 of data. The processor 36 first filters the ancillary stream 30 of data according to the demographic. That is, the processor 36 filters the ancillary stream 30 of data to produce samples 120 of demographic content matching the subscriber's profile 108. Remember, the ancillary stream 30 of data, in this embodiment, comprises samples of all, or most of, the available content listed in the electronic programming guide 26. So the processor 36 first filters the ancillary stream 30 of data to remove all the samples that do not appeal to the subscriber's demographic. The demographic samples that remain (e.g., music, movies, ads) and are not associated with particular content from the electronic programming guide 26 are processed as video and/or audio signals that are played to the subscriber.

The processor 36 then performs a second filtering operation according to the subscriber's selection. As the subscriber browses the electronic programming guide 26, the sampling application 20 allows the subscriber to preview content. The subscriber makes a selection of what sampled content is desired (such as by hovering the on-screen cursor 38 over the listed content, as illustrated in FIG. 2). The processor 36 receives the subscriber's input that selects the particular content from the electronic programming guide (shown, respectively, as reference numerals 40 and 26 in FIG. 2). The processor 36 then again filters the unselected samples to produce the remaining sample 44 of the selected particular content. That is, the sampling application 20 first filters, or removes, from the ancillary stream 30 of data those samples that do not appeal to the subscriber's demographic. Then, when the subscriber selects the particular content for a preview, the sampling application 20 then again filters out the unselected samples. The only remaining sample, corresponding to the selected particular content, is then processed as a video signal, thus producing a preview of the selected particular content 44.

The exemplary embodiments shown in FIG. 7 produce little or no delay, yet, require significant bandwidth. Because the ancillary stream 30 of data includes samples of all the available channels (or content), the subscriber experiences very little delay in receiving the sample. All those samples, however, also require greater bandwidth. Even low resolution samples, as earlier explained, may require an intolerable amount of bandwidth. The service provider, and/or the bandwidth limitations within the communications network 28, may require compromises between bandwidth and the number of samples contained within the ancillary stream 30 of data.

Figure 8:
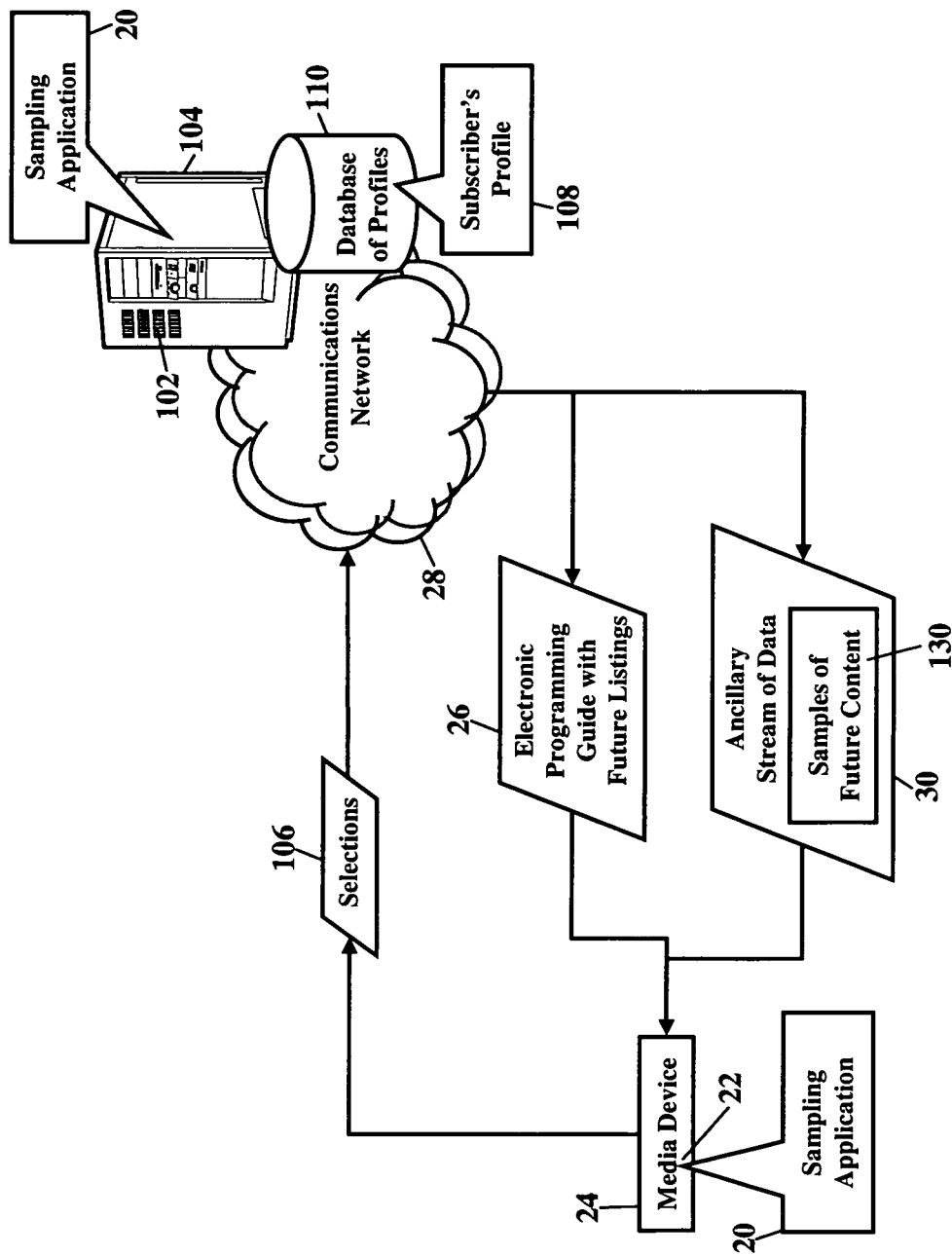
FIG. 8 is a schematic illustrating filtering of the ancillary stream of data for future content, according to the exemplary embodiments.

FIG. 8 is a schematic illustrating filtering of the ancillary stream of data for future content, according to the exemplary embodiments. As the subscriber browses the electronic programming guide 26, the subscriber may wish to view listings of future content available at a future time. The subscriber, for example, may wish to view what content is available during the next hour, the next several hours, next day, or even the next week. The subscriber may also wish to sample, or preview, some of this future content. If the ancillary stream 30 of data is to include a sample of each content listed in the programming guide 26, the bandwidth requirements might be too large for practical implementations. FIG. 8, then, provides a mechanism for reducing the bandwidth requirements for future content.

Here, again, profiling and demographics are used to reduce bandwidth requirements. The electronic programming guide 26 comprises a listing of future content that is available at one or more future times. The ancillary stream 30 of data comprises samples of this future content, but the samples are tailored to match the subscriber's profile 108. As FIG. 8 shows, some or all portions of the sampling application 20 may operate in the computer server 104. The sampling application 20 tracks the subscriber's content selections 106 and builds the subscriber's profile 108. The subscriber's profile 108 is maintained in the database 110 of subscriber profiles.

The sampling application 20 then selects samples 130 of future content that match the subscriber's profile 108. The selected samples 130 of future content reflect observable patterns in the subscriber's profile 108. The sampling application 20 then builds the ancillary stream 30 of data with the samples 130 of future content that match the subscriber's profile 108. The ancillary stream 30 of data thus only contains future samples of content that likely appeal to the subscriber. The ancillary stream 30 of data is thus not burdened with additional bandwidth for samples not appealing to the subscriber. So, even if the subscriber wishes to preview content occurring several hours, or several days, in the future, the ancillary stream 30 of data need not include samples of every possible content choice. The ancillary stream 30 of data only contains samples that appeal to the subscriber's profile 108.

The samples 130 of future content may additionally be tailored to a demographic. The processor 36 filters the samples 130 of future content to remove all the samples that do not appeal to the subscriber's demographic. The future demographic samples that remain are processed as video and/or audio signals that are played to the subscriber. The ancillary stream 30 of data may additionally contain ads, music, previews, or trailers that demographically appeal to the subscriber's profile 108.

The exemplary embodiments also allow subscriber customization of the ancillary stream 30 of data. As the above paragraphs described, the ancillary stream 30 of data may consume too much bandwidth. If the ancillary stream 30 of data contains samples of all, or most of, the available channels or content, bandwidth may be an issue. Whereas the above paragraphs utilize profiling to reduce bandwidth, the subscriber may additionally or alternatively self-limit the numbers of samples contained within the ancillary stream 30 of data. The subscriber, for example, may configure the sampling application 20 to only request and provide samples for certain channels, programs, genres, or demographics. The subscriber, for example, may configure the sampling application 20, and thus the ancillary stream 30 of data, to only include sporting content (such as baseball games, auto races, and the ESPN® channel). The subscriber may additionally or alternatively configure the ancillary stream 30 of data to only include classic movies, home remodeling shows and other similar content, and/or educational content. Whatever genre of content the subscriber desires, the subscriber may tailor the ancillary stream 30 of data to only deliver samples matching those desires.

The exemplary embodiments also allow blocking of content. If the ancillary stream 30 of data requires too much bandwidth, the subscriber may block certain content to reduce bandwidth. The subscriber, for example, may have little or no interest in certain genres, programs, channels, or other content, so the ancillary stream 30 of data need not be burdened with this undesirable content. The subscriber, then, may block, or remove, that undesirable content from the ancillary stream 30 of data. The subscriber, similarly, may find some content objectionable for language, for sexual scenes, or for the subject matter. Whatever the reasons, the subscriber may tailor the ancillary stream 30 of data to never include such objectionable content.

During user configuration, the sampling application 20 may prompt the subscriber to reduce bandwidth. If the user's selections would exceed the available bandwidth (regardless of how the ancillary stream 30 of data is configured), the ancillary stream 30 of data may consume too much bandwidth. The service provider may reserve a portion of the downstream bandwidth for the ancillary stream 30 of data. The service provider, then, may limit the ancillary stream 30 of data to a maximum bit rate. To avoid exceeding the available bandwidth, attempts by the user to add excessive channel samples are blocked, possibly with an error message suggesting deleting other ancillary streams in order to provide the necessary bandwidth.

Bottlenecks, however, may occur in other network locations. Even if the ancillary stream 30 of data is less than or equal to the service provider's imposed maximum bit rate, other bandwidth bottlenecks may occur. The subscriber's home network, for example, may be unable to receive and process the ancillary stream 30 of data. Perhaps the ancillary stream 30 of data is communicated via a wireless I.E.E.E 802 link, and the wireless link is unable to receive and process the ancillary stream 30. The sampling application 20, then, could also notify the subscriber of other bottleneck issues that limit the ancillary stream 30 of data. The sampling application 20 may then again prompt the subscriber during service configuration to remove one or more content samples from the ancillary stream 30 of data. In this case, the sampling application 20 continues to prompt the subscriber until the constraining bottleneck is overcome, and the sampling application 20 then resumes delivery of the ancillary stream 30 of data.

Figure 9:
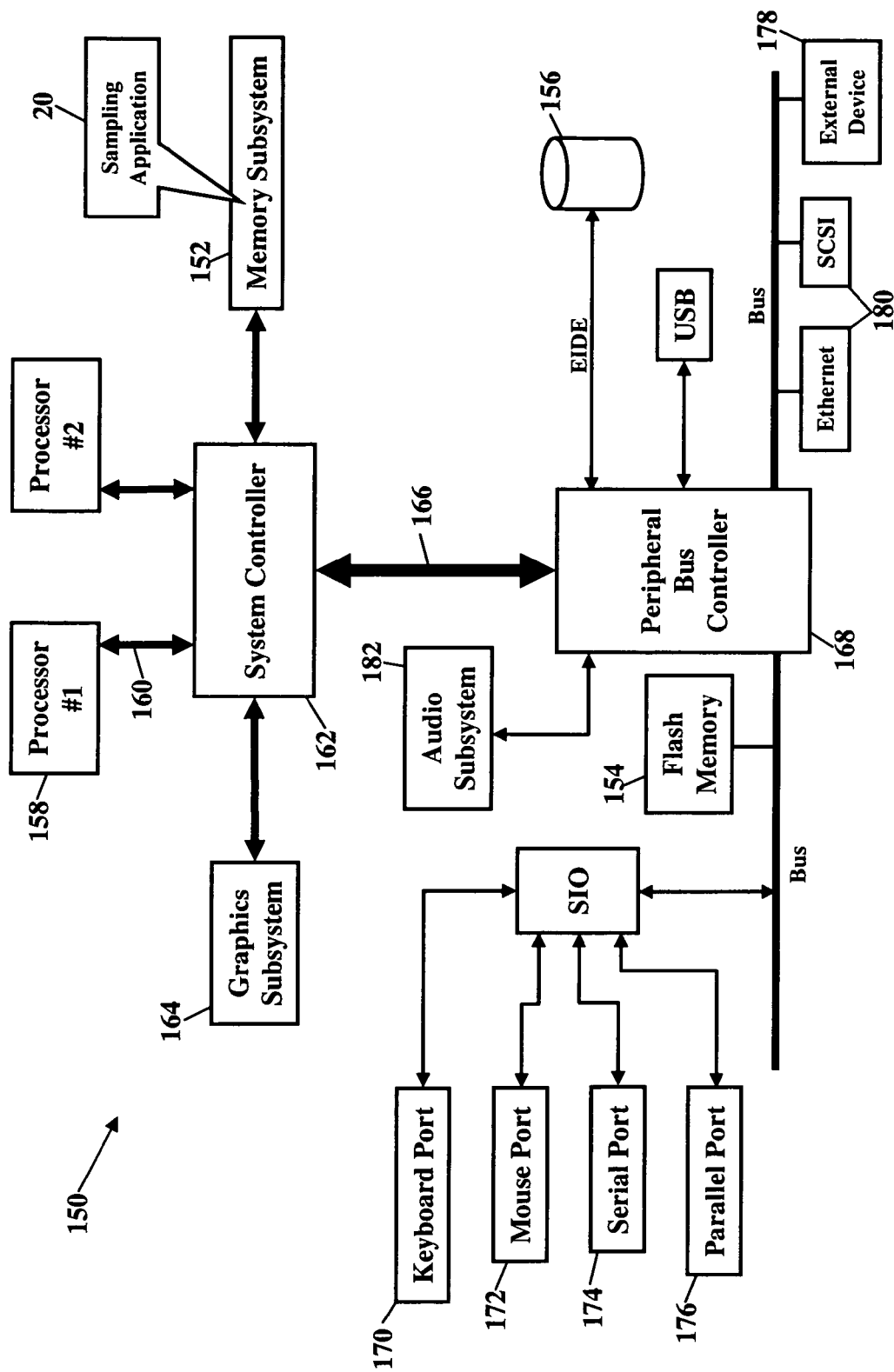
FIG. 9 is a schematic depicting a possible operating environment for the exemplary embodiments.

FIG. 9 depicts another possible operating environment for the exemplary embodiments. FIG. 9 is a block diagram showing the sampling application 20 residing in a processor-controlled system 150 (such as the media device 24 shown in FIG. 1 or the computer server 104 shown in FIG. 6). FIG. 9, however, may also represent a block diagram of any computer or communications device in which the sampling application 20 may operate. The sampling application 20 operates within a system memory device. The sampling application 20, for example, is shown residing in a memory subsystem 152. The sampling application 20, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and networking ports 180 (such as USB, SCSI, or Ethernet). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical Subscriber Interface (GUI). The Graphical Subscriber Interface typically includes a combination of signals communicated along the keyboard port 170 and the mouse port 172. The Graphical Subscriber Interface provides a convenient visual and/or audible interface with a subscriber of the computer system 150.

Figure 10:
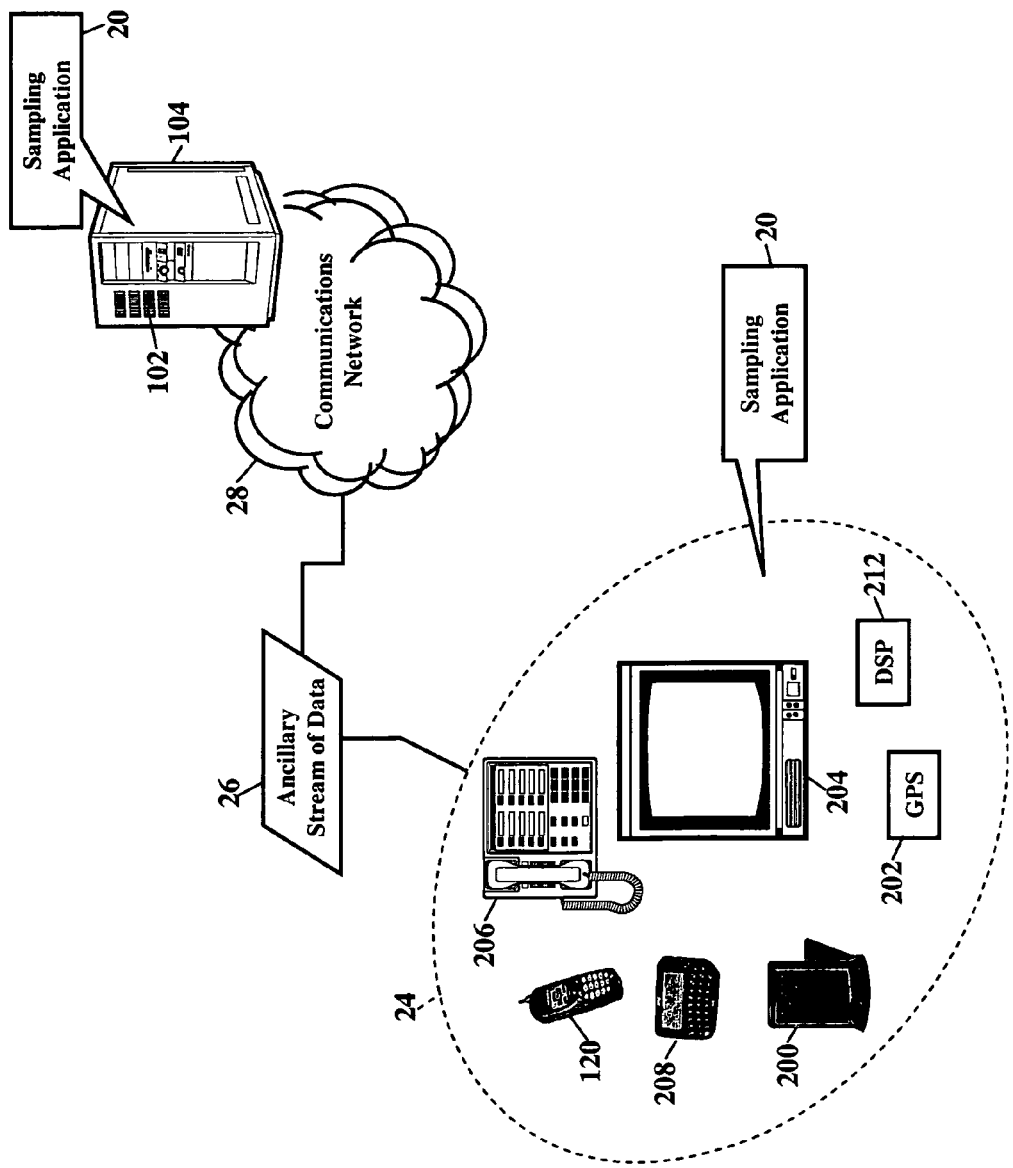
FIG. 10 is a schematic illustrating other possible operating environments for the exemplary embodiments.

FIG. 10 is a schematic illustrating still more exemplary embodiments. FIG. 10 illustrates that the sampling application 20 may alternatively or additionally operate within various other media devices 24. FIG. 10, for example, illustrates that the sampling application 20 may entirely or partially operate within a personal digital assistant (PDA) 200, a Global Positioning System (GPS) device 202, an interactive television 204, an Internet Protocol (IP) phone 206, a pager 208, a cellular/satellite phone 210, or any computer system and/or communications device utilizing a digital signal processor (DSP) 212. The communications device 24 may also include watches, radios, vehicle electronics, clocks, printers, gateways, and other apparatuses and systems.

Figure 11:
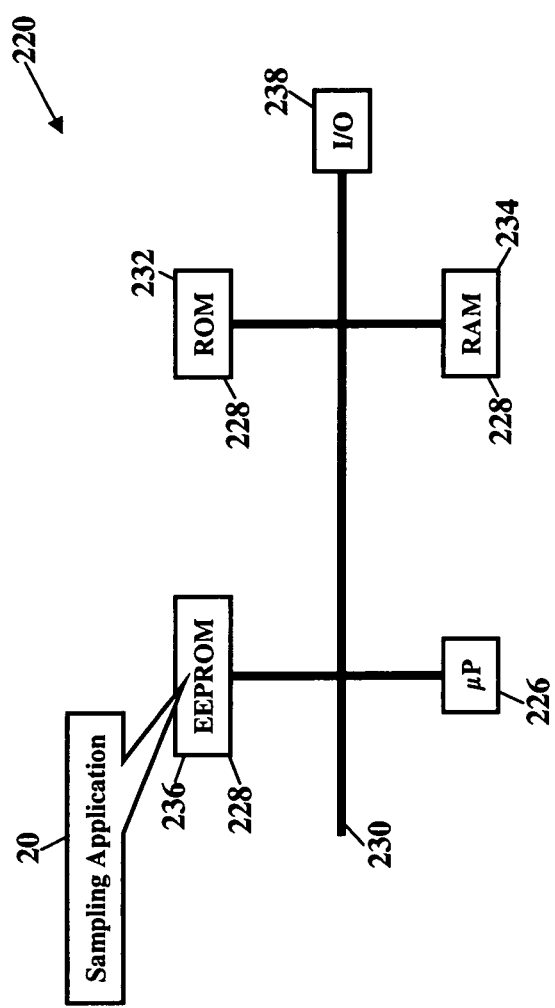

FIGS. 11-13 are schematics further illustrating various other media devices for providing sample content, according to the exemplary embodiments. FIG. 11 is a block diagram of a Subscriber Identity Module 220, while FIGS. 12 and 13 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many media devices (such as the media devices 24 shown in FIG. 10). The Subscriber Identity Module 220 stores subscriber information (such as the subscriber's International Mobile Subscriber Identity, the subscriber's $K_i$ number, and other subscriber information), perhaps the subscriber's profile (shown as reference numeral 108), and any portion of the sampling application 20. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995 January))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996 July))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 11 is a block diagram of the Subscriber Identity Module 220, whether embodied as the plug 222 of FIG. 12 or as the card 224 of FIG. 13. Here the Subscriber Identity Module 220 comprises a microprocessor 226 (NP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the sampling application 20 in one or more of the memory modules 228. FIG. 11 shows the sampling application 20 residing in the Erasable-Programmable Read Only Memory 236, yet the sampling application 20 could alternatively or additionally reside in the Read Only Memory 232 and/or the Random Access/Flash Memory 234. An Input/Output module 238 handles communication between the Subscriber Identity Module 220 and the media device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHM TISAL, GSM CELLULAR RADIO TELEPHONY 99-130 (1997), with each incorporated herein by reference.

Figure 14:
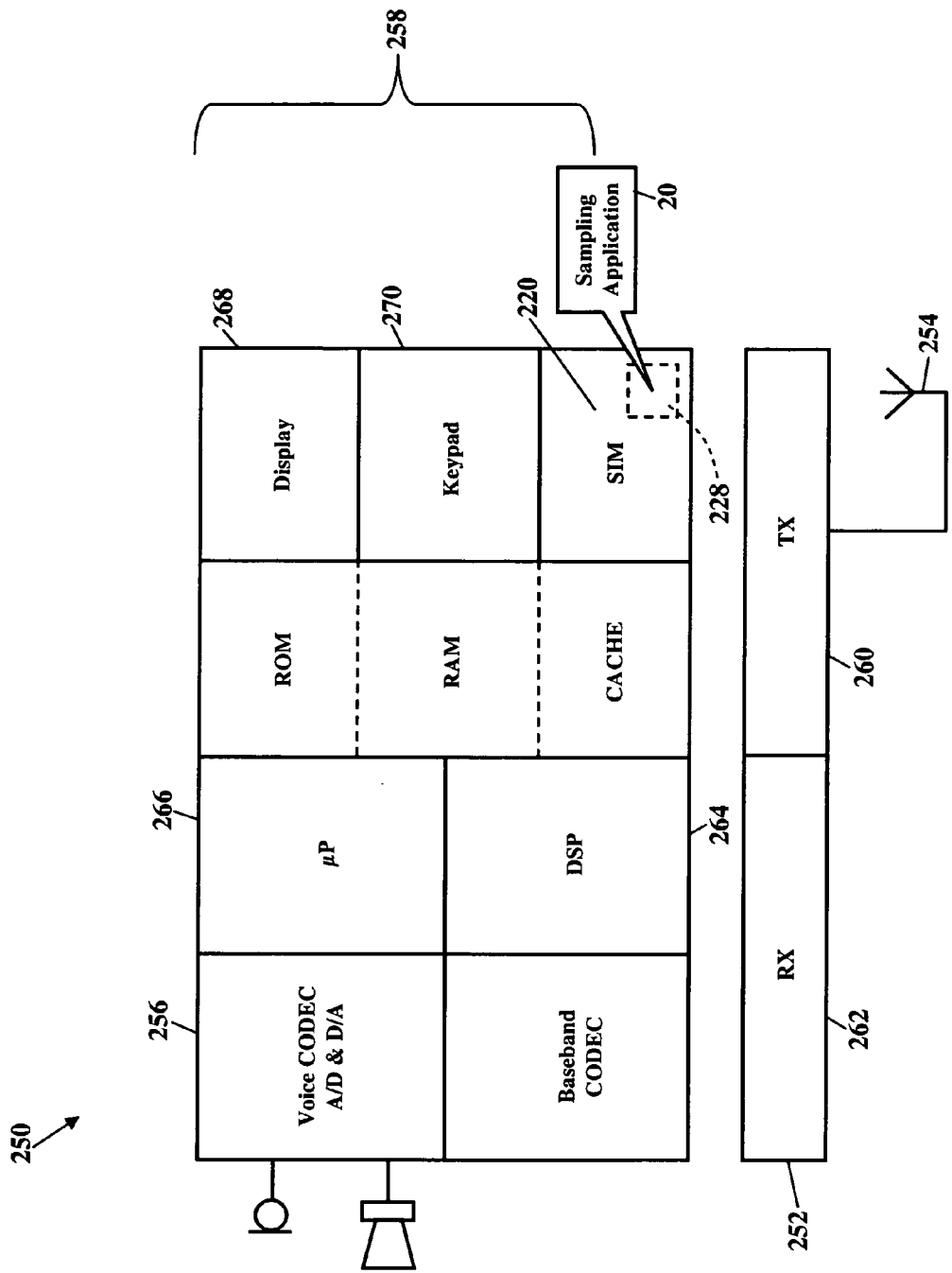

FIG. 14 is a schematic further illustrating various media devices for providing sample content, according to the exemplary embodiments. FIG. 14 is a block diagram of another media device 250 utilizing any portion of the sampling application 20. In one embodiment, the media device 250 comprises a radio transceiver unit 252, an antenna 254, a digital baseband chipset 256, and a man/machine interface (MMI) 258. The transceiver unit 252 includes transmitter circuitry 260 and receiver circuitry 262 for receiving and transmitting radio-frequency (RF) signals. The transceiver unit 252 couples to the antenna 254 for converting electrical current to and from electromagnetic waves. The digital baseband chipset 256 contains a digital signal processor (DSP) 264 and performs signal processing functions for audio (voice) signals and RF signals. As FIG. 14 shows, the digital baseband chipset 256 may also include an on-board microprocessor 266 that interacts with the man/machine interface (MMI) 258. The man/machine interface (MMI) 258 may comprise a display device 268, a keypad 270, and the Subscriber Identity Module 220. The on-board microprocessor 266 performs GSM protocol functions and control functions for the radio circuitry 260 and 262, for the display device 268, and for the keypad 270. The on-board microprocessor 266 may also interface with the Subscriber Identity Module 220 and with the sampling application 20 residing in the memory module 228 of the Subscriber Identity Module 220. Those skilled in the art will appreciate that there may be many suitable architectural configurations for the elements of the media device 250. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The sampling application 20 may be utilized regardless of signaling standard. As those of ordinary skill in the art recognize, FIGS. 11-14 illustrate a Global System for Mobile (GSM) media device. That is, the media device utilizes the Global System for Mobile (GSM) communications signaling standard. Those of ordinary skill in the art, however, also recognize the sampling application 20 is equally applicable to any media device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 15:
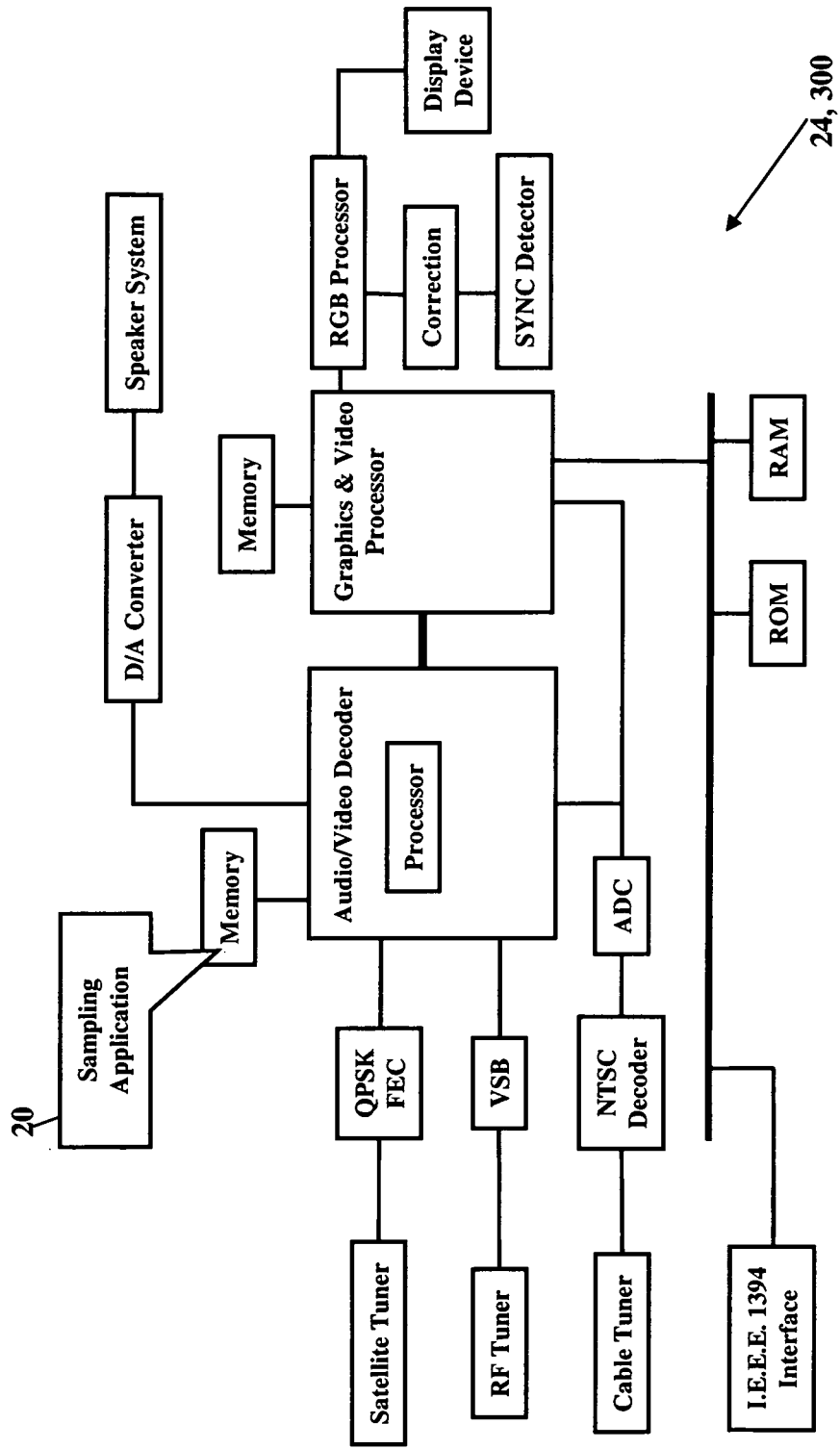
FIG. 15 is a block diagram further illustrating the media device, according to yet more of the exemplary embodiments.

FIG. 15 is a block diagram further illustrating the media device 24, according to yet more of the exemplary embodiments. Here the media device 24 is shown as a digital high definition television (HDTV) system 300. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The content sharing application 22 may be stored in any memory location or device in the television 16. operates within a system memory device. FIG. 15, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004), with each incorporated herein by reference.

The sampling application (shown as reference numeral 20 in FIGS. 1-14) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the sampling application to be easily disseminated. A computer program product comprises the sampling application stored on the computer-readable medium. The sampling application comprises computer-readable instructions/code for receiving an electronic programming guide comprising a listing of available content. An ancillary stream of data is also received and comprises samples of content listed in the electronic programming guide. A subscriber input is received that selects a particular content from the electronic programming guide. Unselected samples of content are filtered from the ancillary stream of data to produce a sample of the selected particular content. The sample is then processed as a video signal, thus producing a preview of the selected particular content.

The sampling application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A server, comprising:
   a processor; and
   a memory device, the memory device storing code, the code when executed causing the processor to perform operations, the operations comprising:
   sending a programming guide to a media device, the programming guide comprising a listing of available content;
   sending a single ancillary stream of data to the media device, the single ancillary stream of data comprising samples of content listed in the programming guide;
   receiving a selection from the single ancillary stream of data, the selection sent from the media device and the selection requesting a sample of the samples of content in the single ancillary stream of data;

receiving a corresponding selection of content from the media device, the corresponding selection of content requesting content in the programming guide that corresponds to the sample selected from the single ancillary stream of data;

determining a common descriptor between the selection associated with the single ancillary stream of data and the corresponding selection of content requested in the programming guide;

filtering the single ancillary stream of data to remove the samples of content that fail to match the common descriptor;

sending a filtered ancillary stream of data to the media device, the filtered ancillary stream of data comprising remaining samples of content listed in the programming guide that remain after the filtering of the single ancillary stream of data to remove the samples of content that fail to match the common descriptor;

receiving a user input sent from the media device, the user input selecting one of the remaining samples of content for a preview from the filtered ancillary stream of data;

removing unselected samples of content from the filtered ancillary stream of data not selected for the preview; and sending a remaining sample in the filtered ancillary stream of data to the media device as the preview.

2. The server of claim 1, wherein the operations further comprise retrieving a video as the remaining sample.

3. The server of claim 1, wherein the operations further comprise receiving a future selection of future content in the programming guide.

4. The server of claim 1, wherein the operations further comprise receiving a genre selection that limits genres of programming listed in the programming guide.

5. The server of claim 1, wherein the operations further comprise monitoring how much of the remaining sample was received.

6. The server of claim 5, wherein the operations further comprise monitoring how much of the content was received.

7. The server of claim 1, wherein the operations further comprise retrieving a textual description associated with the remaining sample.

8. A method for providing a preview, comprising:

sending, by a server, a programming guide to a media device, the programming guide comprising a listing of available content;

sending, by the server, a single ancillary stream of data to the media device, the single ancillary stream of data comprising samples of content listed in the programming guide;

receiving, at the server, a selection in the single ancillary stream of data, the selection sent from the media device, the selection requesting a delivery of a sample of the samples of content in the single ancillary stream of data;

receiving, at the server, a corresponding selection of content sent from the media device, the corresponding selection of content requesting a content listed in the programming guide that corresponds to the sample requested in the single ancillary stream of data;

determining, by the server, a common descriptor between the selection in the single ancillary stream of data and the corresponding selection of content listed in the programming guide;

filtering, by the server, the ancillary stream of data to remove the samples of content from the single ancillary stream of data that fail to match the common descriptor;

sending, by the server, a filtered ancillary stream of data to the media device, the filtered ancillary stream of data comprising remaining samples of content listed in the programming guide that remain after the filtering to remove the samples of content that fail to match the common descriptor;

receiving, by the server, a user input sent from the media device that selects a selected content from the programming guide for a preview;

removing, by the server, unselected samples of content from the filtered ancillary stream of data not selected for the preview; and processing, by the server, one remaining sample in the filtered ancillary stream of data for display as the preview.

9. The method of claim 8, further comprising retrieving a video as the one remaining sample.

10. The method of claim 8, further comprising retrieving a textual description of the one remaining sample.

11. The method of claim 8, further comprising receiving a future selection of future content listed in the programming guide.

12. The method of claim 8, further comprising monitoring how much of the one remaining sample was received.

13. The method of claim 12, further comprising monitoring how much of the selected content was received.

14. A memory device storing code that when executed cause a processor to perform operations, the operations comprising:

sending a programming guide from a server to a media device, the programming guide comprising a listing of available content;

sending a single ancillary stream of data from the server to the media device, the ancillary stream of data comprising samples of content listed in the programming guide;

receiving a selection from the single ancillary stream of data, the selection sent from the media device, the selection requesting one of the samples of content in the single ancillary stream of data;

receiving a corresponding selection of content sent from the media device, the corresponding selection of content requesting content from the programming guide that corresponds to the one of the samples of content;

determining a common descriptor between the selection from the single ancillary stream of data and the corresponding selection of content from the programming guide;

filtering the ancillary stream of data to remove the samples of content that fail to match the common descriptor;

sending a filtered ancillary stream of data from the server to the media device, the filtered ancillary stream of data comprising remaining samples of content listed in the programming guide that remain after the filtering to remove the samples of content that fail to match the common descriptor;

receiving a user input from the media device that selects one of the remaining samples of content for a preview from the programming guide;

removing by the server unselected samples of content from the filtered ancillary stream of data not selected for the preview; and sending from the server one remaining sample in the filtered ancillary stream of data for display as the preview.

15. The memory device of claim 14, wherein the operations further comprise limiting bandwidth consumed by the ancillary stream of data.

16. The memory device of claim 14, wherein the operations further comprise receiving a user configuration that blocks objectionable content from the single ancillary stream of data.

17. The memory device of claim 14, wherein the operations further comprise receiving a user configuration that blocks an objectionable genre of content from the single ancillary stream of data.

18. The memory device of claim 14, wherein the operations further comprise:
   determining the single ancillary stream of data exceeds a maximum bit rate; and
   prompting the media device to remove some of the samples of content listed in the programming guide to reduce bandwidth consumption.

19. The memory device of claim 14, wherein the operations further comprise receiving a user configuration that limits genres of the programming available in the single ancillary stream of data.

20. The memory device of claim 14, wherein the operations further comprise:
   determining the single ancillary stream of data exceeds a maximum bit rate available in a home network; and
   prompting the media device to remove some of the samples of content listed in the programming guide to reduce bandwidth consumption in the home network.

* * * * *